Patented June 11, 1935

2,004,867

UNITED STATES PATENT OFFICE 2,004,867

PROCESS FOR MAKING POTASSIUM OXALATE

Emil Hene, Berlin, Germany, assignor to Rudolph Koepp & Co., Chem. Fabrik A. G., Oestrich, Germany No Drawing. Application May 24, 1933, Serial No. 672,736. In Germany May 30, 1932

5 Claims. (Cl. 260—115)

It is known to produce oxalates by heating formates in the absence of air. It is also known to carry out this conversion in a vacuum at temperatures below 360° C.

These processes have essentially been carried out with sodium formate as starting material. Researches have shown, however, that the conditions which suffice for the conversion of sodium formate are insufficient for the conversion of potassium formate.

The present invention removes these difficulties. The invention, therefore, relates to a process for making potassium oxalate from potassium formate at temperatures below 350° C., advantageously at about 320° C., for about one hour and suitably with addition of alkali, for example in the form of hydroxide, and is characterized by the feature that gas, preferably nitrogen or carbon monoxide or hydrogen, is led through the melt. The introduction of the gas is done in the usual manner, for example by means of tubes.

Heating potassium formate in a suitable vessel, for example a test-tube at about 310° yields a melt which is completely or almost completely unconverted into oxalate.

As soon as a gas is supplied and led through the melt however, the typical small bubbles, which indicate the conversion into oxalate, arise through the whole mass.

If the temperature is kept constant then the introduction of the unheated gas forthwith brings about a small temperature rise amounting to a few degrees. This phenomenon is extremely surprising and is valuable economically, since it offers the possibility of carrying out the desired conversion in the simplest way at low temperature and with high yields without costly or dangerous apparatus being necessary.

The reaction may advantageously be carried out in a vessel made of aluminum or enamel or even in glazed vessels; it may also be carried out in apparatus made of iron.

Any gas may be used for carrying out the invention which does not render the reaction impossible.

It may also be of advantage to add alkali to the potassium formate.

In order to accelerate the reaction the charge may be treated while stirring in a stirring mechanism, a worm or drum mill and the like.

Operations may also be carried out in such a way that the charge is treated only until it has a high oxalate content, when it is transferred in this state and in the absence of oxygen into a vessel which is heated above 400° C. in order there to complete the reaction.

Examples (1) 4 g. of commercial potassium formate are brought up to about 300° C. while passing nitrogen through the melt during a period of about 15 minutes. The temperature is then slowly raised to 340° C. and left at this height for an hour without the gas stream being shut off.

About 85% of the formate is converted into oxalate, while about 10% is present in undecomposed form and can be simply recovered in the known manner.

(2) 3.87 g. of potassium formate with 3% of KOH are heated to 300° C. while conducting carbon monoxide through the melt during a period of 15 minutes, whereupon the temperature is slowly increased to 340° and maintained for about 1 hour.

About 93% of the formate is converted into oxalate, while 6% is still present, which can be readily recovered in the known manner.

(3) The procedure is exactly the same as in Example 2, but in addition a subsequent heating is carried out for 10 minutes to 420° C.

About 95% of the formate is converted into oxalate while 1% still remains present.

What I claim is:

1. A process for making potassium oxalate from potassium formate consisting in melting potassium formate at a temperature between 350° C. and 300° C. and bubbling an inert gas through the melt at normal pressure.

2. A process for making potassium oxalate from potassium formate consisting in melting potassium formate at a temperature between 350° C. and 300° C. and bubbling nitrogen gas through the melt at normal pressure.

3. A process for making potassium oxalate from potassium formate consisting in melting potassium formate at a temperature between 350° C. and 300° C. and bubbling carbon-monoxide through the melt at normal pressure.

4. A process for making potassium oxalate from potassium formate consisting in melting potassium formate at a temperature between 350° C. and 300° C. stirring the melt and bubbling an inert gas through the same at normal pressure.

5. A process for making potassium oxalate from potassium formate consisting in melting the latter at a temperature of about 320° C. and bubbling an inert gas for about one hour through the melt at normal pressure.

EMIL HENE.